United States Patent
Harada

(10) Patent No.: US 11,149,707 B2
(45) Date of Patent: Oct. 19, 2021

(54) WIND TURBINE BLADE AND METHOD FOR DETERMINING ARRANGEMENT OF VORTEX GENERATOR ON WIND TURBINE BLADE

(71) Applicant: MITSUBISHI HEAVY INDUSTRIES, LTD., Tokyo (JP)

(72) Inventor: Motoshi Harada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/884,113

(22) Filed: Jan. 30, 2018

(65) Prior Publication Data

US 2019/0120204 A1 Apr. 25, 2019

(30) Foreign Application Priority Data

Oct. 20, 2017 (JP) .............................. JP2017-203809

(51) Int. Cl.
*F03D 1/06* (2006.01)

(52) U.S. Cl.
CPC ...... *F03D 1/0675* (2013.01); *F05B 2240/122* (2013.01); *F05B 2240/30* (2013.01)

(58) Field of Classification Search
CPC .... F03D 1/0608; F03D 1/0633; F03D 1/0641; F03D 1/065; F03D 1/0658; F03D 1/0675; F03D 1/0683; F03D 7/022; B64C 23/06; F01D 5/141; F01D 5/145; F15D 1/12; F05B 2240/30; F05B 2240/122
USPC ................................................... 416/236 R
See application file for complete search history.

(56) References Cited

U.S. PATENT DOCUMENTS

| 10,458,388 B2 | 10/2019 | Fukami | |
|---|---|---|---|
| 2008/0175711 A1* | 7/2008 | Godsk | F03D 1/0633 416/147 |
| 2010/0143144 A1* | 6/2010 | Anjuri | F03D 1/06 416/228 |

(Continued)

FOREIGN PATENT DOCUMENTS

| CN | 201771673 U | 3/2011 |
|---|---|---|
| DE | 10 2013 201 871 A1 | 8/2014 |

(Continued)

OTHER PUBLICATIONS

Peter J. Schubel and Richard J. Crossley, "Wind Turbine Blade Design", Sep. 6, 2012, MDPI, Energies 2012 (Year: 2012).*

(Continued)

*Primary Examiner* — Woody A Lee, Jr.
*Assistant Examiner* — Justin A Pruitt
(74) *Attorney, Agent, or Firm* — Manabu Kanesaka; Benjamin Hauptman; Kenneth Berner

(57) ABSTRACT

A wind turbine blade has a vortex generator including a plurality of fins, and a height H(m) of each of the fins and a maximum chord length C (m) of the wind turbine blade satisfies $0.3 \times 10^{-2} \leq H/C \leq 0.9 \times 10^{-2}$. The height H of the fins may satisfy $H \geq 0.1\delta_1$, provided that $\delta_1$ is a boundary layer thickness at a rated tip speed ratio in a blade degradation state. A method for determining arrangement of a vortex generator on the wind turbine blade includes a pair of the fins arranged line-symmetrically with respect to a segment along a chordwise direction of the wind turbine blade.

8 Claims, 10 Drawing Sheets

(56) References Cited

U.S. PATENT DOCUMENTS

| | | | | |
|---|---|---|---|---|
| 2012/0151769 A1* | 6/2012 | Brake | ............... | F03D 1/0608 |
| | | | | 29/889.71 |
| 2012/0282105 A1* | 11/2012 | Grife | ............... | F03D 1/0675 |
| | | | | 416/228 |
| 2014/0140856 A1* | 5/2014 | Madsen | ............... | F03D 7/0232 |
| | | | | 416/236 R |
| 2014/0328693 A1* | 11/2014 | Wilson | ............... | F01D 5/02 |
| | | | | 416/236 R |
| 2015/0322791 A1 | 11/2015 | Flach | | |
| 2016/0177914 A1* | 6/2016 | Enevoldsen | ......... | F03D 1/0633 |
| | | | | 416/228 |
| 2017/0138339 A1 | 5/2017 | Fukami | | |
| 2017/0138341 A1 | 5/2017 | Fukami | | |
| 2017/0248116 A1 | 8/2017 | Fukami et al. | | |
| 2017/0248117 A1 | 8/2017 | Fukami et al. | | |

FOREIGN PATENT DOCUMENTS

| | | |
|---|---|---|
| EP | 1886016 A1 | 2/2008 |
| EP | 2 484 898 A1 | 8/2012 |
| EP | 2 739 529 | 6/2014 |
| EP | 2 824 320 A1 | 1/2015 |
| EP | 3168458 A1 | 5/2017 |
| EP | 3211220 A1 | 8/2017 |
| EP | 3282120 A1 | 2/2018 |
| JP | 2017-089526 A | 5/2017 |
| JP | 2017-089561 A | 5/2017 |
| JP | 6154050 B1 | 6/2017 |
| JP | 2017-150447 A | 8/2017 |
| JP | 2017-150448 A | 8/2017 |
| WO | 2006/122547 A1 | 11/2006 |
| WO | 2008/113349 A2 | 9/2008 |
| WO | 2014/198353 A1 | 12/2014 |
| WO | 2015/030573 A1 | 3/2015 |

OTHER PUBLICATIONS

Europe Patent Office, "Search Report for European Patent Application No. 18157184.5," dated May 2, 2019.
Europe Patent Office, "Search Report for European Patent Application No. 18157184.5," dated Aug. 8, 2018.
Europe Patent Office, "Office Action for European Patent Application No. 18157184.5," dated Nov. 11, 2019.
Europe Patent Office, "Office Action for European Patent Application No. 18157184.5," dated Jun. 15, 2020.
Japan Patent Office, "Office Action for Japanese Patent Application No. 2017-203809," dated Aug. 4, 2020.
Europe Patent Office, "Oral Proceedings for European Patent Application No. 18157184.5," dated Aug. 9, 2021.

* cited by examiner

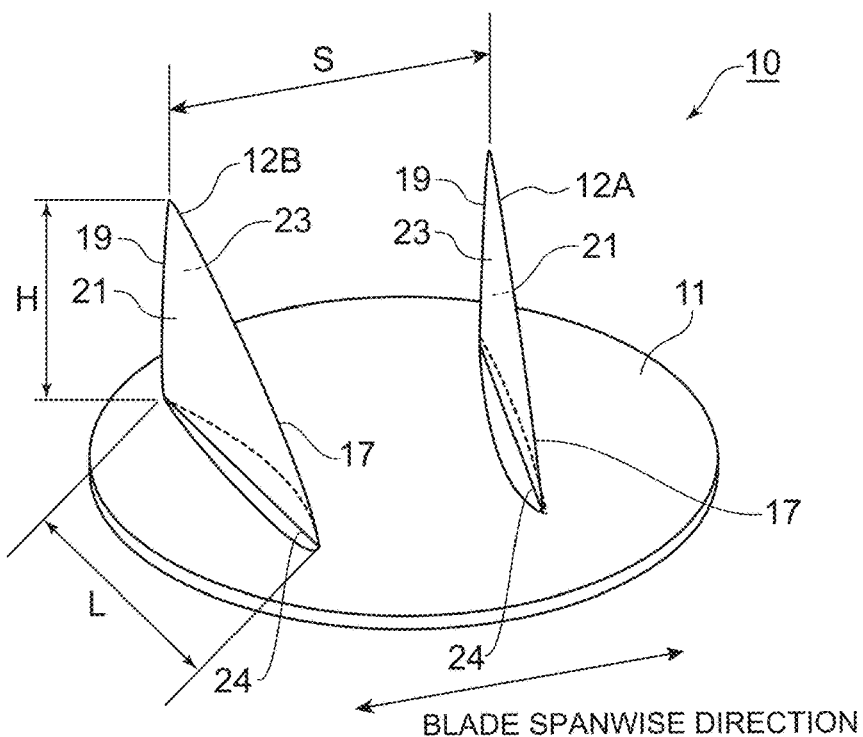
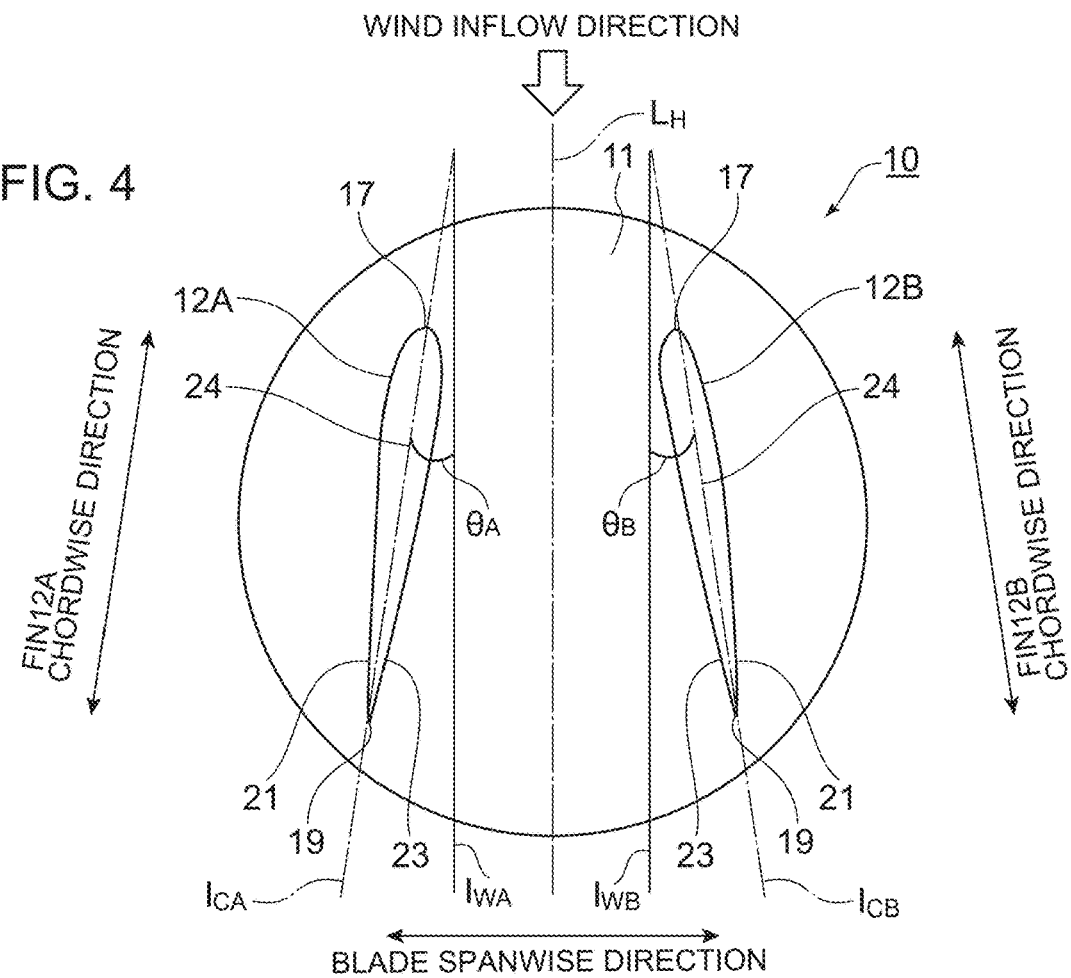

BLADE SPANWISE DIRECTION

VELOCITY DISTRIBUTION
OF TURBULENT BOUNDARY
LAYER

FIG. 12
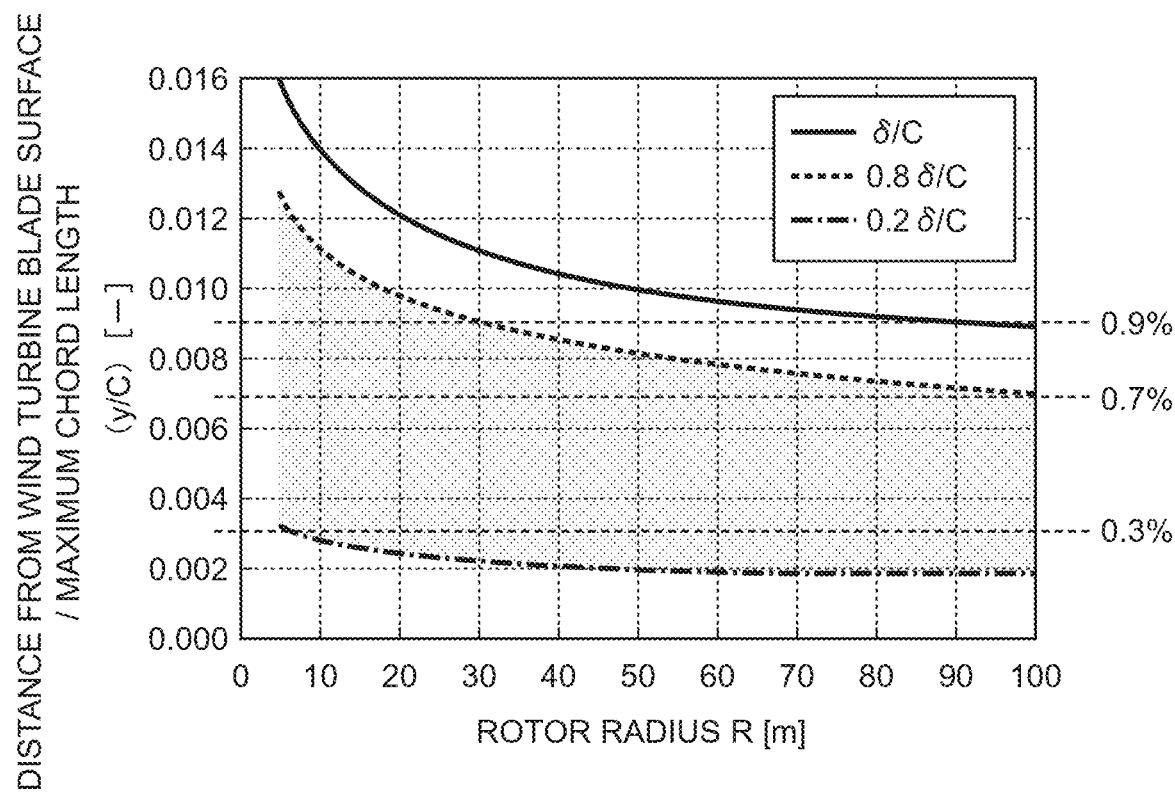
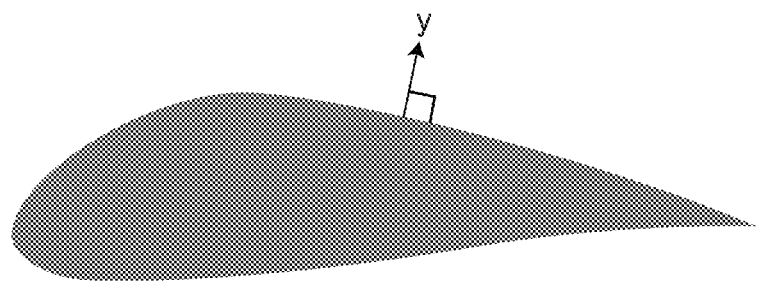

FIG. 13
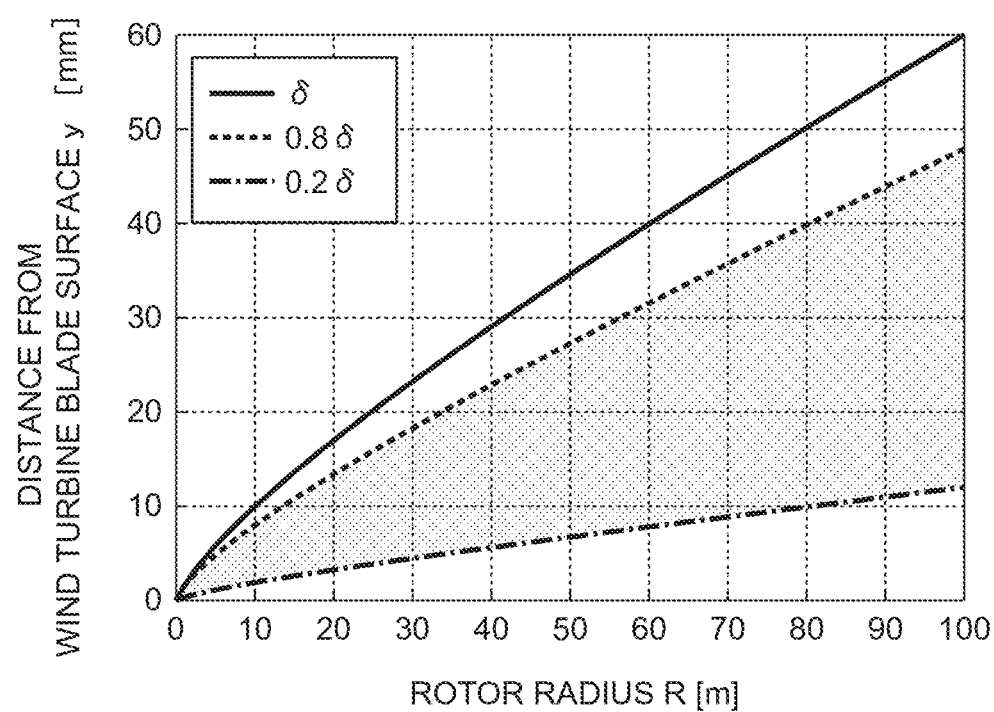
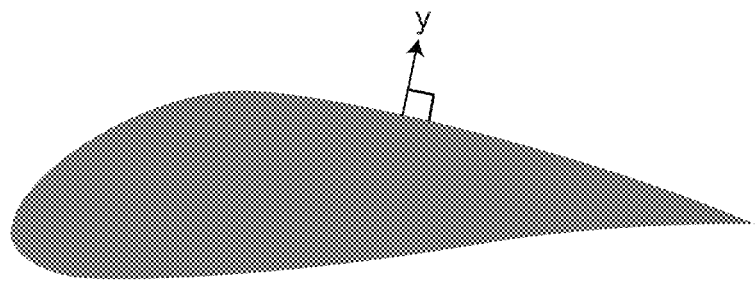

WIND TURBINE BLADE AND METHOD FOR DETERMINING ARRANGEMENT OF VORTEX GENERATOR ON WIND TURBINE BLADE

RELATED APPLICATIONS

The present application is based on, and claims priority from, Japanese Application No. JP2017-203809 filed Oct. 20, 2017, the disclosure of which is hereby incorporated by reference herein in its entirety.

TECHNICAL FIELD

The present disclosure relates to a wind turbine blade and a method for determining arrangement of a vortex generator on a wind turbine blade.

BACKGROUND ART

Approaches to improve aerodynamic performance of a wind turbine blade have been sought for some time to improve operation efficiency of a wind turbine. In one of the approaches, a vortex generator (hereinafter, also referred to as VG) is disposed on a surface of a wind turbine blade to suppress separation of a flow along the surface of the wind turbine blade.

For instance, with regard to VGs to be attached to the surface of a wind turbine blade, Patent Document 1 discloses performing retrofit by using VG with different heights, on different positions in the blade spanwise direction.

CITATION LIST

Patent Literature

Patent Document 1: EP2484898A

SUMMARY

However, in the disclosure of Patent Document 1, the size of VGs to be applied to a wind turbine blade having a certain size (≈rotor diameter) is not mentioned at all, and the suitable relationship between the size of the wind turbine blade and the size of VGs remains unclear. Thus, it is difficult to design VGs having a suitable size, with respect to the size of a wind turbine that may be developed in future.

In view of the above problem, an object of at least one embodiment of the present invention is to provide a vortex generator having a suitable size with respect to the size of a wind turbine blade.

(1) A wind turbine blade according to at least one embodiment of the present invention comprises a vortex generator including a plurality of fins, and a height H(m) of each of the fins and a maximum chord length C(m) of the wind turbine blade satisfy $0.3 \times 10^{-2} \le H/C \le 0.9 \times 10^{-2}$.

When applying the vortex generator to the blade root portion of the wind turbine blade, it is important to apply a vortex generator having an appropriate size with respect to the size of the wind turbine blade, referring to a parameter related to the wind turbine as an index. The present inventors found that it is possible to apply a vortex generator having an appropriate size with respect to the size of a wind turbine blade, by deriving a suitable relationship between the maximum chord length of the wind turbine blade and the height H of the fin of the vortex generator. Thus, with the above configuration (1), it is possible to provide a vortex generator having a suitable size with respect to the size of a wind turbine blade.

(2) In some embodiments, in the above configuration (1), the height H of the fins may satisfy $H \ge 0.1\delta_1$, provided that $\delta_1$ is a boundary layer thickness at a rated tip speed ratio in a blade degradation state.

The boundary layer tends to develop and become thick in the blade degradation state, where the height of the fin for suppressing separation matters. However, as the height of the fin increases, the demerit due to the influence of drag of the fin itself outweighs the advantageous effect of the fin to suppress separation. The present inventors conducted intensive researches and found that it is possible to maintain a good balance between drag and the effect to suppress separation, with the fin having a height H that satisfies $H \ge 0.1\delta_1$, with respect to the boundary layer thickness $\delta_1$ in the blade degradation state. Thus, with the above configuration (2), it is possible to obtain the wind turbine blade provided with the vortex generator having a good balance between drag and the effect to suppress separation in the blade degradation state.

(3) In some embodiments, in the above configuration (1) or (2), the height H of the fins may satisfy $H \le \delta_2$, provided that $\delta_2$ is a boundary layer thickness at an optimum tip speed ratio in a blade normal state.

In the blade normal state, the surface of the wind turbine blade is smooth, and thus the boundary layer thickness $\delta_2$ is relatively small. Thus, if the height of the fin is greater than a height that is required to suppress separation, the demerit from drag becomes dominant. Thus, the present inventors conducted intensive researches and found that it is possible to maintain a good balance between drag and the effect to suppress separation, with the fin having a height that satisfies $H \le \delta_2$, with respect to the boundary layer thickness $\delta_2$ in the blade normal state. Thus, with the above configuration (3), it is possible to obtain the wind turbine blade provided with the vortex generator having a good balance between drag and the effect to suppress separation in the blade normal state.

(4) In some embodiments, in any one of the above configurations (1) to (3), the fins are configured such that an angle of a fin chord with reference to an inflow direction of wind is not smaller than 12 degrees and not greater than 18 degrees.

The angle of the fin chord with reference to the wind inflow direction corresponds to the attack angle of the fin. If the attack angle is too large, the flow around the fin is more likely to separate at the side of the leading edge of the fin, which may cause speed reduction. In contrast, if the attack angle of the fin is too small, it may be not possible to obtain a preferable lift for generating the longitudinal vortex. As a result of studies conducted by the present inventors, as in the above (4), with the angle of the fin chord with respect to the wind inflow direction being not smaller than 12 degrees and not greater than 18 degrees, it is possible to stabilize generation of the longitudinal vortex by the vortex generator, and to improve the effect to suppress separation.

(5) In some embodiments, in any one of the above configurations (1) to (4), the fins may be configured such that a ratio L/H of a chord length L of a fin root to the height H of the fins satisfies $2.0 \le L/H \le 4.0$.

Generally, lift slope varies depending on the planar shape of the blade (fin), and the lift coefficient that can be achieved at the same attack angle varies depending on the aspect ratio L/H. Thus, to promote generation of longitudinal vortices and enhance the effect to suppress separation, it is desirable to provide a threshold for the aspect ratio of the fin. Thus, according to findings of the present inventors, as in the above configuration (5), with the fin having a shape such that L/H satisfies 2.0≤L/H≤4.0, it is possible to obtain lift that is effective in generating longitudinal vortices, and to enhance the effect of the vortex generator to suppress separation.

(6) In some embodiments, in any one of the above configurations (1) to (5), the vortex generator may further include a platform portion mounted to a surface of the wind turbine blade, the platform portion having a front surface on which the fins are to be erected and a flat bottom surface opposite to the front surface, and a cross section of the platform portion may have a curved convex shape, at least along a blade spanwise direction of the wind turbine blade.

With the above configuration (6), the platform portion of the vortex generator has a cross section of a curved convex shape along the blade spanwise direction, and thereby the platform portion is deformable in accordance with bending deformation of the wind turbine blade, which makes it possible to disperse stress generated at the platform portion. Thus, it is possible to reduce a risk of falling off of the vortex generator from the surface of the wind turbine blade.

(7) In some embodiments, in any one of the above configurations (1) to (6), the vortex generator includes a plurality of fin sets each of which is formed by a pair of fins arranged such that suction surfaces of the fins face each other, and a ratio S/H of an interval S between trailing edges of the pair of fins to the height H of the fins satisfies 2.5≤S/H≤5.0.

As S/H decreases, the interval between the generated longitudinal vortices decreases, and mutual interference among the longitudinal vortices may cause reduction of the effect to suppress separation. In addition, an increased number of fins may increase drag of the vortex generator itself. On the other hand, as S/H increases, the interval between the generated longitudinal vortices increases. In this case, there are many locations without any longitudinal vortex in the mounting range of the vortex generator on the wind turbine blade, which may be a cause of reduction of the effect to suppress separation. Thus, as in the above (7), with S/H satisfying 2.5≤S/H≤5.0 in the present embodiment, it is possible to effectively enjoy the technical benefit from provision of the vortex generator.

(8) In some embodiments, in any one of the above configurations (1) to (7), the height H(m) of each of the fins and a radius R(m) of a rotor including the wind turbine blade satisfies $0.2 \times 10^{-3} \leq H/R \leq 0.7 \times 10^{-3}$.

As described in the above (1), when applying the vortex generator to the blade root portion of the wind turbine blade, it is important to apply a vortex generator having an appropriate size with respect to the size of the wind turbine blade, referring to a parameter related to the wind turbine as an index. The present inventors found that it is possible to apply a vortex generator having an appropriate size with respect to the size of a wind turbine blade, by deriving a suitable relationship between the radius R of the rotor including the wind turbine blade and the height H of the fin of the vortex generator. Thus, with the above configuration (8), it is possible to provide a vortex generator having a suitable size with respect to the size of a wind turbine blade.

(9) In a method for determining arrangement of a vortex generator on the wind turbine blade according to any one of the above (1) to (8), according to at least one embodiment of the present invention, the vortex generator includes a pair of the fins arranged line-symmetrically with respect to a segment along a chordwise direction of the wind turbine blade.

With the above configuration (9), it is possible to arrange the vortex generator in an appropriate direction with respect to the inflow direction of wind, and to stabilize generation of vortices by the vortex generator.

(10) In a method for determining arrangement of a vortex generator on the wind turbine blade according to any one of the above (1) to (8), according to at least one embodiment of the present invention, the vortex generator includes a plurality of fin sets each of which is formed by a pair of the fins arranged such that the suction surfaces of the fins face each other, and the vortex generator is arranged such that a ratio Z/S of an arrangement pitch Z of adjacent two of the fin sets to an interval S between trailing edges of the pair of fins is not smaller than 1.5 and not greater than 3.0.

To enhance the effect to suppress separation, it is desirable to arrange the vortex generator densely. In contrast, to reduce drag, it is desirable to arrange the vortex generator less densely. Thus, as in the above method (10), by arranging the vortex generator with a density such that Z/S is not smaller than 1.5 and not greater than 3.0, it is possible to achieve both of the effect to suppress separation and the effect to reduce drag at the same time.

(11) In a method for determining arrangement of a vortex generator on the wind turbine blade according to any one of the above (1) to (8), according to at least one embodiment of the present invention, the vortex generator includes a plurality of fin sets each of which is formed by a pair of the fins arranged such that the suction surfaces of the fins face each other, and the vortex generator is arranged such that a ratio Z/H of an arrangement pitch Z of adjacent two of the fin sets to the height H of the pair of fins is not smaller than 6.0 and not greater than 8.0.

As described in the above (10), to enhance the effect to suppress separation, it is desirable to arrange the vortex generator densely. On the other hand, as the interval between adjacent fin sets decreases, the effect to suppress separation may reduce due to mutual interference among the generated longitudinal vortices. Thus, as in the above configuration (11), by arranging the vortex generator 10 such that Z/H is not small than 6.0 and not greater than 8.0, it is possible to enjoy the effect to suppress separation and the effect to reduce drag at the same time.

According to some embodiments of the present invention, it is possible to provide a vortex generator having a suitable size with respect to the size of a wind turbine blade.

BRIEF DESCRIPTION OF DRAWINGS

FIG. 3 is a perspective view of a vortex generator according to an embodiment.

FIG. 4 is a top view of a vortex generator according to an embodiment.

FIG. 12 is a diagram showing the relationship between the rotor radius and the representative thickness of the boundary layer in the maximum chord cross section, wherein the representative thickness is a dimensionless quantity expressed as a ratio of the maximum chord length.

FIG. 13 is a diagram showing the relationship between the rotor radius and the representative thickness of the boundary layer in the maximum chord cross section.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
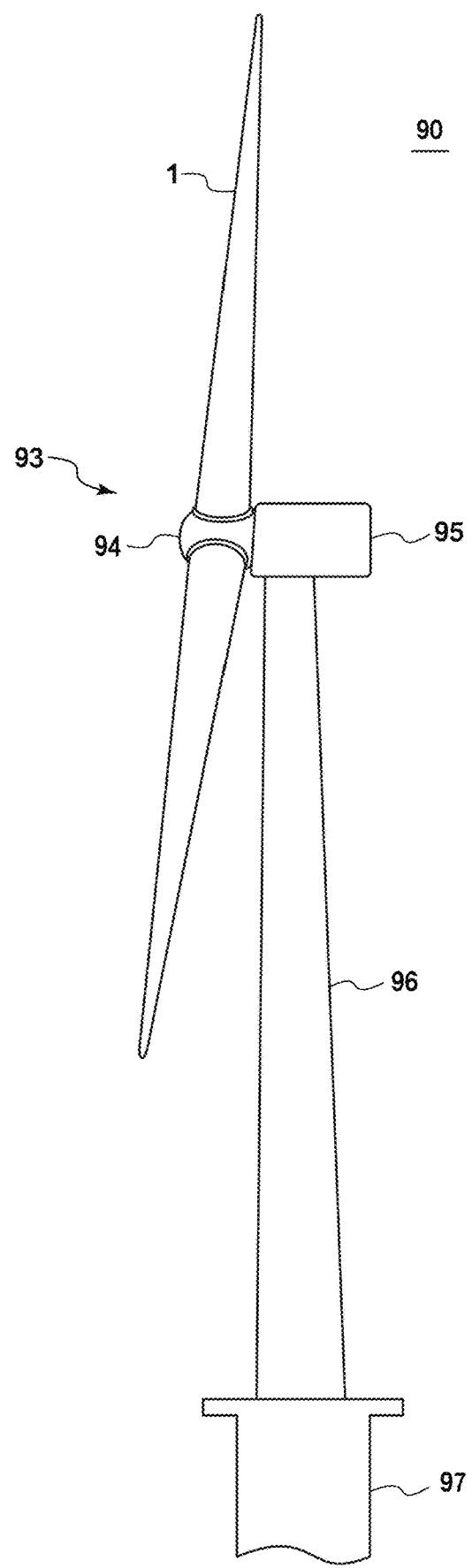
FIG. 1 is a schematic configuration diagram of a wind turbine power generating apparatus according to an embodiment.
Figure 2:
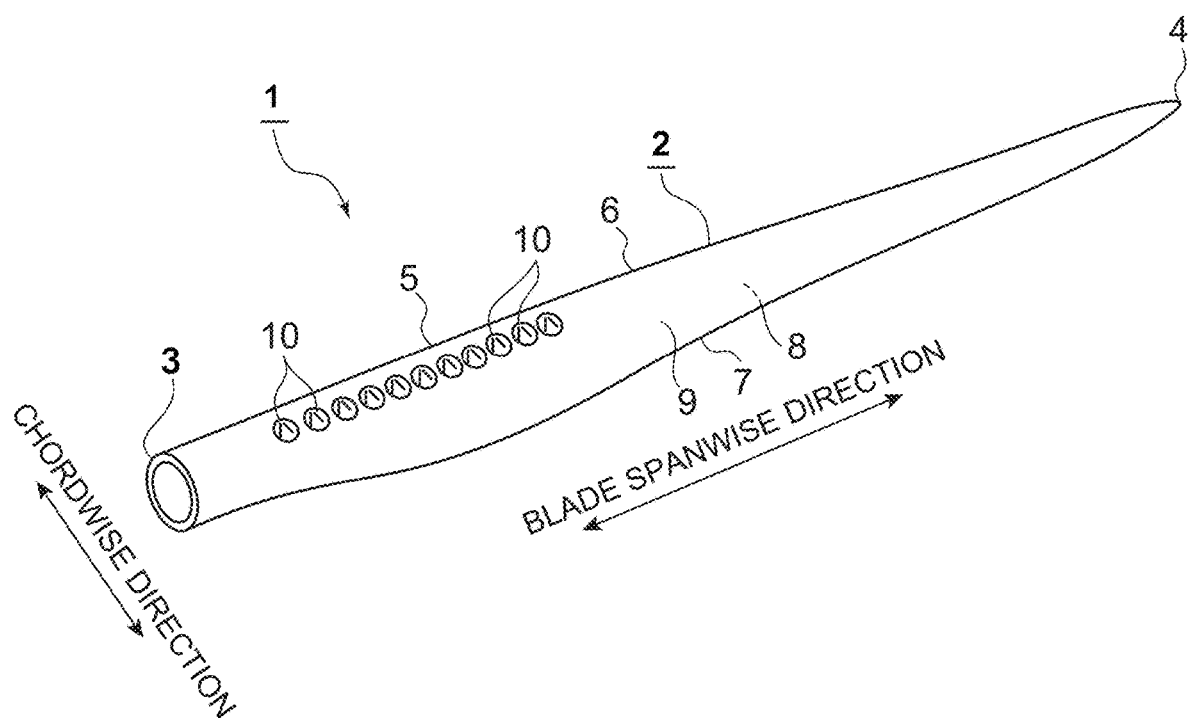
FIG. 2 is a perspective view of a wind turbine blade assembly including a vortex generator according to an embodiment.

With reference to FIGS. 1 and 2, overall configuration of a wind turbine blade assembly and a wind turbine power generating apparatus to which a vortex generator according to some embodiments is to be applied will be described. FIG. 1 is a schematic configuration diagram of a wind turbine power generating apparatus according to an embodiment. FIG. 2 is a perspective view of a wind turbine blade assembly to which a vortex generator according to an embodiment is to be applied.

As shown in FIG. 1, a wind turbine power generating apparatus 90 includes at least one (e.g. three) wind turbine blade assemblies 1. The wind turbine blade assemblies 1 include a wind turbine blade 2 and a vortex generator 10. The wind turbine blade assemblies 1 are mounted to a hub 94 in a radial fashion, and the wind turbine blade assemblies 1 and the hub 94 constitute a rotor 93 of the wind turbine power generating apparatus 90. The rotor 93 rotates in response to wind received by the wind turbine blade assemblies 1, and a generator (not shown) coupled to the rotor 93 generates electric power.

In the embodiment depicted in FIG. 1, the rotor 93 is supported by a nacelle 95 disposed on an upper part of a tower 96. The tower 96 is disposed to stand upright on a base structure 97 (e.g. foundation structure or floating structure) disposed on water or on land.

As described below, a vortex generator 10 according to an embodiment is mounted to the wind turbine blade 2 of the wind turbine blade assemblies 1, in the wind turbine power generating apparatus 90 having the above configuration.

As shown in FIG. 2, the wind turbine blade assembly 1 includes a wind turbine blade 2. The vortex generator 10 according to an embodiment is mounted to the surface (blade surface) of the wind turbine blade 2. In FIG. 2, the vortex generator 10 is already mounted to the wind turbine blade 2 of the wind turbine blade assembly 1.

The wind turbine blade 2 includes a blade root 3 to be attached to the hub 94 of the wind turbine power generating apparatus 90, a blade tip 4 positioned farthest from the hub 94, and an airfoil part 5 extending between the blade root 3 and the blade tip 4. The wind turbine blade 2 has a leading edge 6 and a trailing edge 7 from the blade root 3 to the blade tip 4. Further, an exterior shape of the wind turbine blade 2 is formed by a pressure surface 8 and a suction surface 9 disposed opposite to the pressure surface 8.

As shown in FIG. 2, in the wind turbine blade assembly 1, a plurality of the vortex generators 10 are mounted to the suction surface 9 of the wind turbine blade 2. Furthermore, the plurality of vortex generators 10 are mounted to the suction surface 9 of the wind turbine blade 2 in a blade spanwise direction.

Hereinafter, "blade spanwise direction" refers to a direction connecting the blade root 3 and the blade tip 4, and "blade chordwise direction" refers to a direction along a line (chord) connecting the leading edge 6 and the trailing edge 7 of the wind turbine blade 2.

Next, the configuration of the vortex generator 10 will be described in detail with reference to FIGS. 3 and 4. FIG. 3 is a perspective view of a vortex generator according to an embodiment. FIG. 4 is a top view of a vortex generator according to an embodiment.

As shown in FIG. 3, the vortex generator 10 according to some embodiments includes a platform portion 11 fixed to a surface of the wind turbine blade assembly 1 (more specifically, to a surface of the wind turbine blade 2) and at least one fin 12 disposed upright on the platform portion 11. In the embodiment shown in FIGS. 3 and 4, the vortex generator 10 includes a pair (two in total) of fins 12 (12A, 12B) disposed so as to be adjacent to each other on the platform portion 11.

In the embodiment shown in FIGS. 3 and 4, the platform portion 11 has a circular shape in a top view.

In some embodiments, the platform portion 11 may have a shape other than a circular shape. For instance, the platform portion 11 may have an oval shape, or a polygonal shape such as a rectangular shape.

Furthermore, in some embodiments, the vortex generator 10 may not necessarily include the platform portion 11, and the fin 12 may be directly mounted to the wind turbine blade 2.

In some embodiments, the fin 12 is configured such that a ratio L/H of the chord length L of the fin root to the height H of the fin 12 satisfies $2.0 \leq L/H \leq 4.0$ (see FIG. 3).

Generally, lift slope (a manner of increase of lift coefficient with respect to attack angle) is affected by the planar shape of the blade, and the lift coefficient that can be achieved at the same attack angle varies depending on the aspect ratio L/H. To obtain a desirable lift F for generating a longitudinal vortex 29 (described below), the aspect ratio L/H should be greater. However, an excessively great aspect ratio L/H leads to reduction of lift slope, which may make it difficult to obtain a sufficient lift F to generate a longitudinal vortex 29. Accordingly, to obtain a suitable lift F for generating a longitudinal vortex 29 with respect to the angle (attack angle) formed between the wind inflow direction and the fin chord 24, it is desirable to provide a threshold for the aspect ratio L/H of the fin 12.

Thus, in the present embodiment, with the fin 12 having a shape such that L/H satisfies 2.0≤L/H≤4.0, it is possible to obtain lift F that is effective in generating the longitudinal vortex 29, and to enhance the effect of the vortex generator 10 to suppress separation.

In some embodiments, a ratio S/H of the interval S between the trailing edges of a pair of fins 12 to the height H of the fins 12 satisfies 2.5≤S/H≤5.0 (see FIG. 3).

S/H is a value related to the distance between the trailing edges of a pair of fins 12. As S/H decreases, the distance between longitudinal vortices 29 generated on the side of the trailing edges 29 of the fins 12 also decreases. Thus, the longitudinal vortices 29 may interfere with each other, causing reduction of the effect to suppress separation. In addition, as S/H decreases, the number of the fins 12 in the mounting region of the vortex generator 10 on the wind turbine blade 2 increases. Thus, drag of the vortex generator 10 itself increases, which may cause occurrence of drag penalty. On the other hand, as S/H increases, the interval between the generated longitudinal vortices 29 increases. In this case, there are many locations without any longitudinal vortex 29 in the mounting range of the vortex generator 10 on the wind turbine blade 2, which may be a cause of reduction of the effect to suppress separation. Accordingly, with S/H satisfying 2.5≤S/H≤5.0 as in the present embodiment, it is possible to effectively enjoy the technical benefit from provision of the vortex generator 10.

FIG. 4 is a planar view of the vortex generator 10 shown in FIG. 3. In some embodiments, the angle θ ($θ_A$, $θ_B$) formed between segment $l_w$ ($l_{wA}$, $l_{wB}$) along the wind inflow direction and the extension line $l_C$ ($l_{CA}$, $l_{CB}$) of the fin chord 24 is not smaller than 12 degrees and not greater than 18 degrees.

The angle θ of the fin chord 24 with reference to the wind inflow direction corresponds to the attack angle of the fin 12. If the attack angle is too large, the flow around the fin 12 is more likely to separate at the side of the leading edge 17 of the fin 12, which may cause speed reduction. In contrast, if the attack angle of the fin 12 is too small, it may be not possible to obtain a suitable lift F for generating the longitudinal vortex 29. As a result of studies conducted by the present inventors, with the angle θ of the fin chord 24 with respect to the wind inflow direction being not smaller than 12 degrees and not greater than 18 degrees, it is possible to stabilize generation of the longitudinal vortex 29 by the vortex generator 10, and to improve the effect to suppress separation.

In some embodiments, as shown in FIG. 4, the fin 12 is disposed on the wind turbine blade 2 such that the extension lines $l_{CA}$ and $l_{CB}$ of the fin chords form a predetermined angle with the line $L_H$ along the chordwise direction of the wind turbine blade 2.

In FIG. 4, each of the fins 12A, 12B is disposed so that the gap between the pair of fins 12A, 12B widens from upstream toward downstream with respect to the inflow direction of wind (i.e., from the side of the leading edge 6 toward the side of the trailing edge 7 of the wind turbine blade 2 (see FIG. 2), in a state where the vortex generator 10 is mounted to the wind turbine blade 2).

In some embodiments, each of the fins 12A, 12B may be disposed so that a gap between the pair of fins 12A, 12B widens from downstream toward upstream with respect to the inflow direction of wind (i.e., from the side of the trailing edge 7 toward the side of the leading edge 6 of the wind turbine blade 2 (see FIG. 2) in a state where the vortex generator 10 is mounted to the wind turbine blade 2).

Furthermore, in an embodiment, the fins 12 may be disposed on the wind turbine blade 2 while the vortex generator 10 is oriented such that the line $L_H$ along the chordwise direction of the wind turbine blade 2 bisects the angle formed by the extension lines $l_{CA}$ and $l_{CB}$ of a pair of fin chords. In other words, the vortex generator 10 may include a pair of fins 12A, 12B disposed line-symmetrically with respect to a segment along the chordwise direction of the wind turbine blade 2.

As described above, with reference to the chord of the wind turbine blade 2 along the wind inflow direction, the vortex generator 10 is arranged at an angle with respect to the fin chord. Accordingly, it is possible to mount the vortex generator 10 to the wind turbine blade 2 in a mounting direction suitable to enhance the effect to suppress separation, with respect to the wind inflow direction.

Figure 5:
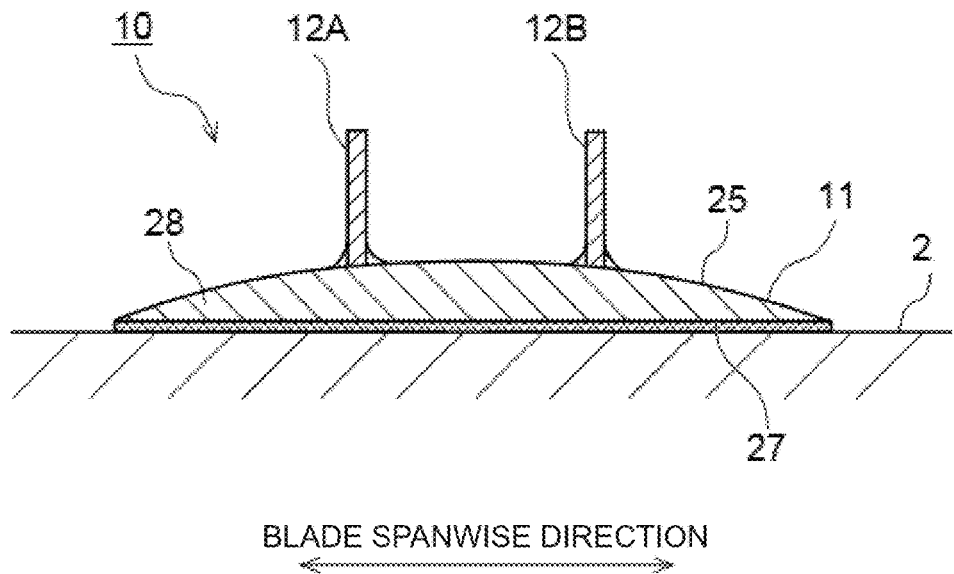
FIG. 5 is a cross-sectional view of a vortex generator according to an embodiment, taken along the blade spanwise direction.

In FIG. 5, depicted is a cross section 28 of the platform portion 11 of the vortex generator 10 taken along the blade spanwise direction. As shown in FIG. 5, in the vortex generator 10 according to some embodiments, the platform portion 11 has a front surface 25 exposed to outside, and a back surface 27 opposite to the front surface 25 of the wind turbine blade 2. As shown in FIG. 5, in some embodiments, the cross section 28 of the platform portion 11 along the blade spanwise direction has a curved convex shape.

Herein, "curved convex shape" refers to a shape that bulges in a direction away from the wind turbine blade 2 to have, at least partially, a bulged portion with a curved profile (the shape of the front surface 25 of the platform portion 11).

The profile of the bulged portion may be formed by an arc having a single curvature radius as in the embodiment depicted in FIG. 5, or may be formed by combination of a plurality of arcs having different curvature radii, or combination of arcs having one or more curvature radii and one or more straight lines, in another non-depicted embodiment.

During operation of the wind turbine power generating apparatus 90, the wind turbine blade 2 deforms flexurally due to bending deformation caused by an aerodynamic load. Thus, a great stress is applied to the platform portion 11 of the vortex generator 10 mounted to the surface of the wind turbine blade 2. In this regard, with the above embodiment, the platform portion 11 of the vortex generator 10 has a cross section of a curved convex shape along the blade spanwise direction of the wind turbine blade 2, and thereby the platform portion is deformable in accordance with bending deformation of the wind turbine blade 2, which makes it possible to disperse stress generated at the platform portion 11.

Figure 6:
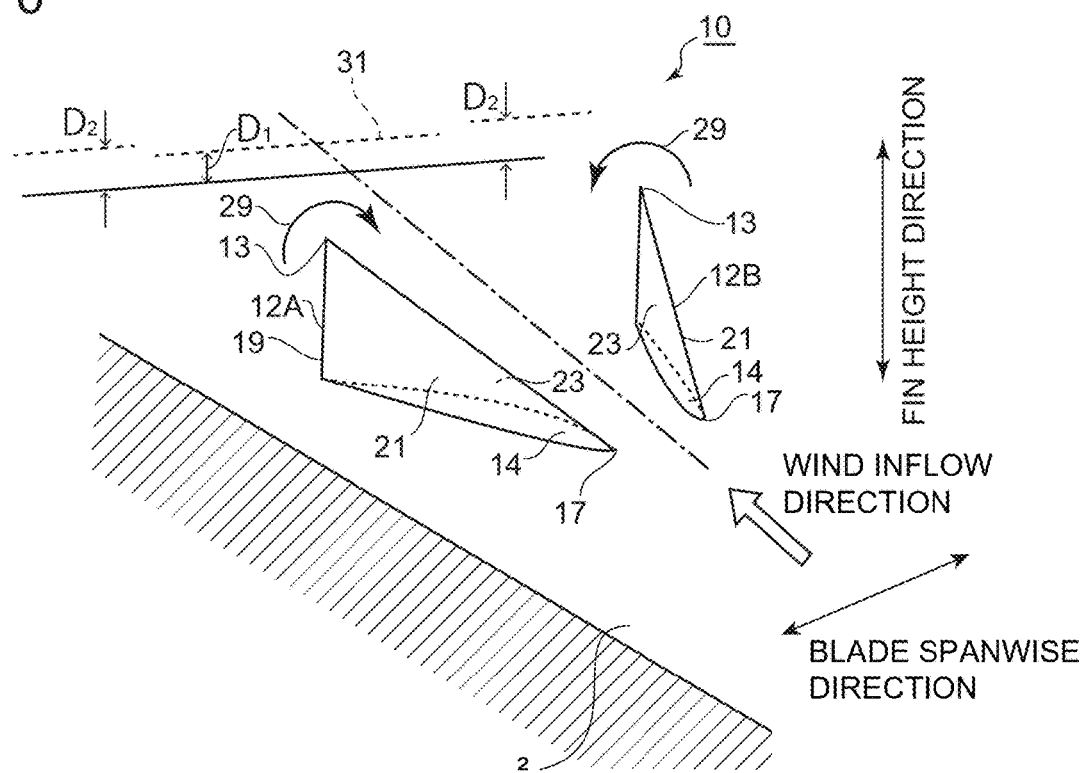
FIG. 6 is a diagram for describing a flow around the fin of a vortex generator according to an embodiment.

An aerodynamic function of the vortex generator 10 will now be described briefly. FIG. 6 is a perspective diagram for describing function of the vortex generator 10. In FIG. 6, only a pair of adjacent fins 12A, 12B is depicted, from among a fin row (a plurality of pairs of fins 12A, 12B) formed by arranging a plurality of vortex generators 10 shown in FIGS. 3 and 4 in the blade spanwise direction of the wind turbine blade 2.

Separation of a flow at the suction surface 9 of the wind turbine blade 2 takes place due to a boundary layer becoming gradually thicker from a streamline flow region in the vicinity of the leading edge 6 toward a turbulent flow region downstream thereof, and the flow being separated before arriving at the trailing edge 7.

As shown in FIG. 6, the vortex generator 10 mounted to the wind turbine blade 2 normally generates a longitudinal vortex 29 on the side of the suction surface 23 of the fin 12 with lift F produced by the fin 12. The longitudinal vortex 29 promotes momentum exchange between outside and inside of a boundary layer 31 at a wake-flow side of the fin 12. Accordingly, in the region between the suction surfaces 23 of the adjacent fins 12, the thickness D of the boundary layer 31 of wake of the fins 12 decreases (D1<D2). Thus, with the plurality of fins 12 arranged in the blade spanwise direction, the boundary layer 31 at the surface of the wind turbine blade 2 becomes thin as a whole, which suppresses trailing edge separation of the wind turbine blade 2.

Figure 7:
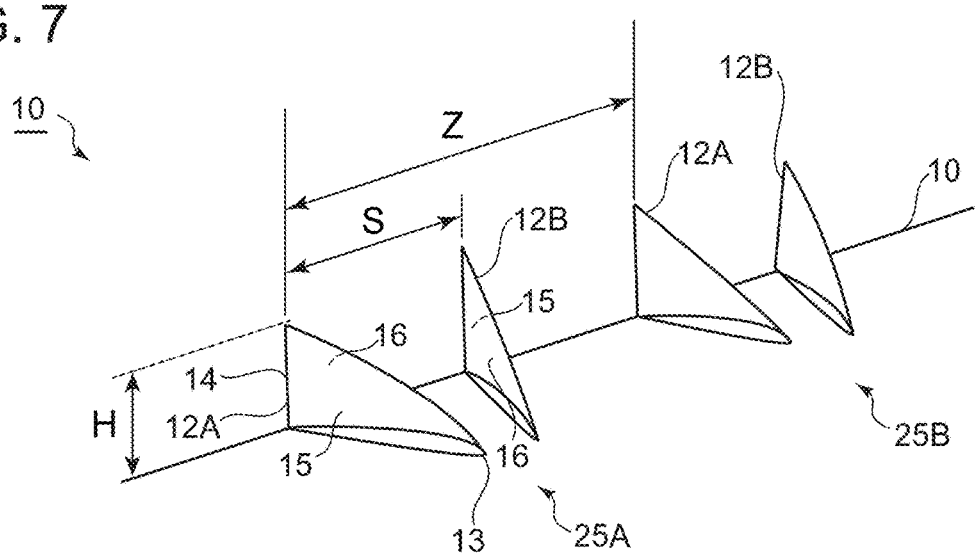
FIG. 7 is a perspective view of a vortex generator according to an embodiment.

FIG. 7 is a perspective view of the vortex generator 10 mounted to the wind turbine blade 2. As shown in FIG. 7, the vortex generator 10 according to some embodiments includes a plurality of fin sets 25 each formed by a pair of fins (12A, 12B), the fins each having a pressure surface 15 and a suction surface 16 and being arranged such that the respective suction surfaces 16 face each other. In some embodiments, the vortex generator 10 is arranged such that a ratio Z/S of the arrangement pitch Z of the two adjacent fin sets (25A, 25B) to the interval S of the trailing edges 14 of the pair of fins (12A, 12B) is not smaller than 1.5 and not greater than 3.0.

To enhance the effect to suppress separation, it is desirable to arrange the vortex generator 10 densely. On the other hand, to reduce drag, it is desirable to arrange the vortex generators 10 less densely. Thus, by arranging the vortex generator 10 with a density such that Z/S is not smaller than 1.5 and not greater than 3.0 as described above, it is possible to achieve both of the effect to suppress separation and the effect to reduce drag at the same time.

Next, the dimension of the vortex generator 10 is normally set in accordance with the boundary layer thickness $\delta$. That is, a desirable height of a fin of the vortex generator 10 is a height that does not cause drag penalty, while covering the boundary layer thickness $\delta$.

Figure 8:
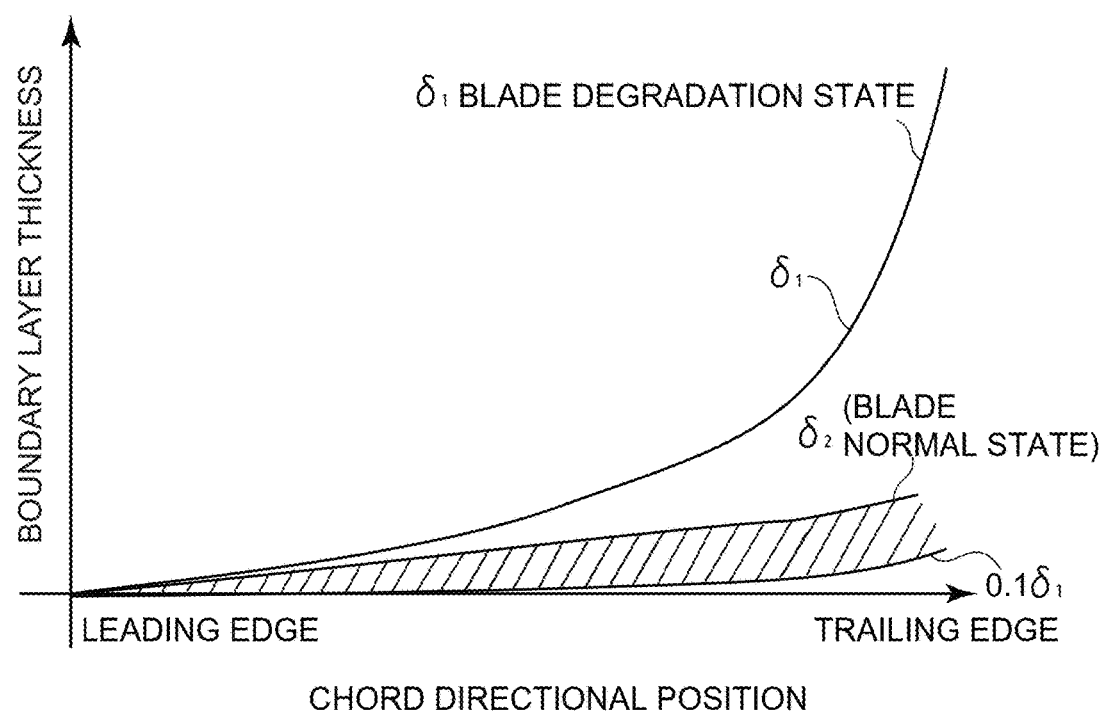
FIG. 8 is a graph showing the relationship between the chordwise directional position and the boundary layer thickness.

FIG. 8 is a graph showing the boundary thickness layer $\delta$ ($\delta_1$ and $\delta_2$) in the chordwise direction, in a blade degradation state and a blade normal state According to FIG. 8, the boundary layer thickness $\delta$ varies considerably toward the trailing edge 7, between $\delta_1$ in the blade degradation state and $\delta_2$ in the blade normal state. Thus, even if the vortex generator 10 has a dimension suitable for the boundary layer $\delta_1$ in the blade degradation state at the trailing edge side, the dimension considerably exceeds the boundary layer $\delta_2$ in the blade normal state. Accordingly, the drag of the vortex generator 10 itself increases, and drag penalty occurs. In contrast, even if the vortex generator 10 has a dimension suitable for the blade normal state at the trailing edge side, the thickness is smaller than the boundary layer thickness $\delta_1$ in the blade degradation state. Accordingly, the effect to suppress separation decreases in the blade degradation state.

In view of this, in some embodiments of the present disclosure, in the above configuration, the height H of the fin 12 satisfies H≥0.1$\delta_1$, with respect to the boundary layer thickness $\delta_1$ at the rated tip speed in the blade degradation state.

The boundary layer tends to develop and become thick in the blade degradation state, where the height of the fin 12 for suppressing separation matters. However, as the height H of the fin 12 increases, the demerit due to the influence of drag of the fin 12 outweighs the advantageous effect of the fin 12 to suppress separation. The present inventors conducted intensive researches and found that it is possible to maintain a good balance between drag and the effect to suppress separation, with the fin 12 having a height H that satisfies H≥0.1$\delta_1$, with respect to the boundary layer thickness $\delta_1$ in the blade degradation state. Thus, with the above configuration (2), it is possible to obtain the wind turbine blade 2 provided with the vortex generator 10 having a good balance between drag and the effect to suppress separation in the blade degradation state.

Furthermore, in some embodiment, in the above configuration, the height H of the fin 12 satisfies H≤$\delta_2$, with respect to the boundary layer thickness $\delta_2$ at the optimum tip speed in the blade normal state.

In the blade normal state, the surface of the wind turbine blade 2 is smooth, and thus the boundary layer thickness $\delta_2$ is relatively small. Thus, if the height H of the fin 12 is greater than a height that is required to suppress separation, the demerit from drag becomes dominant. Thus, the present inventors conducted intensive researches and found that it is possible to maintain a good balance between drag and the effect to suppress separation, with the fin 12 having a height H that satisfies H≤$\delta_2$, with respect to the boundary layer thickness $\delta_2$ at the optimum tip speed ratio in the blade normal state. Thus, with the above configuration, it is possible to obtain the wind turbine blade 2 provided with the vortex generator 10 having a good balance between drag and the effect to suppress separation in the blade normal state.

Herein, with reference to FIGS. 9 to 13, the size of the wind turbine blade 2 according to an embodiment and the suitable size of the fin 12 to be mounted to the wind turbine blade 2 will be described.

Figure 9:
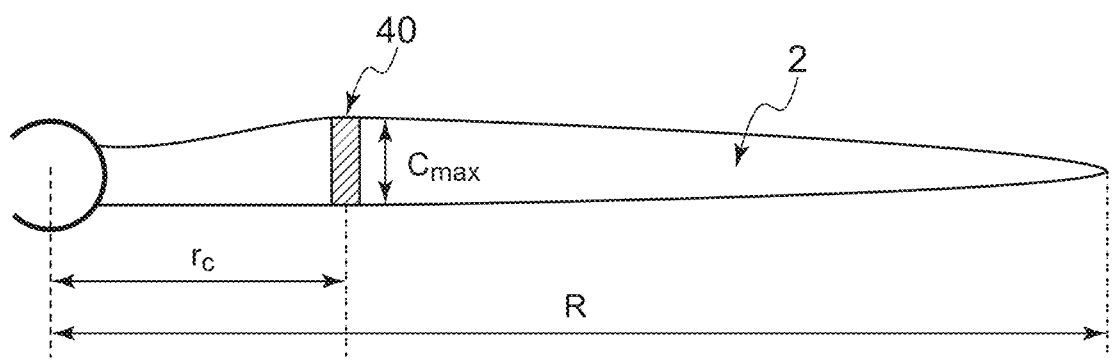
FIG. 9 is a schematic diagram showing the rotor radius, the maximum chord length, and the dimensionless radial directional position of the maximum chord length portion.
Figure 10:
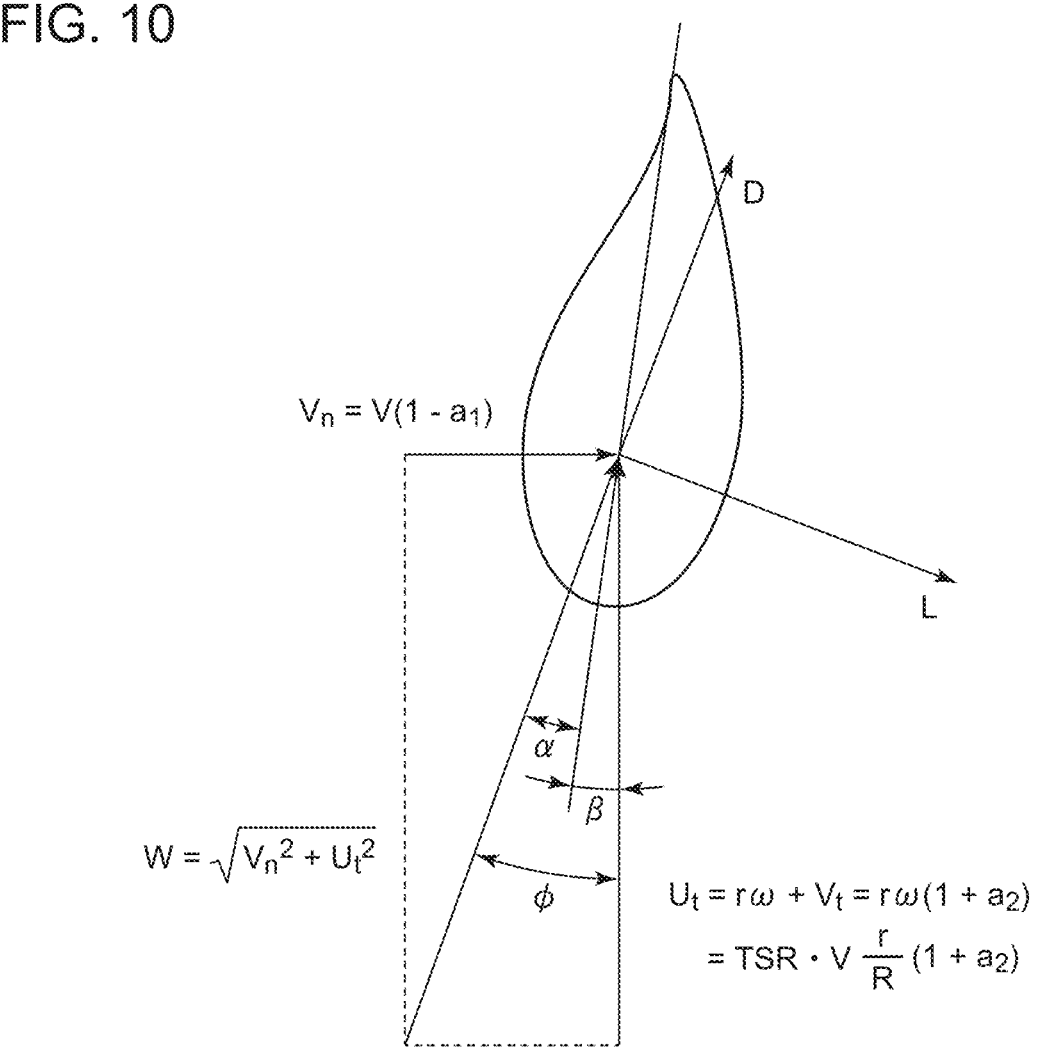
FIG. 10 is a diagram for describing inflow speed of wind into a wind turbine, and tip speed ratio.
Figure 11:
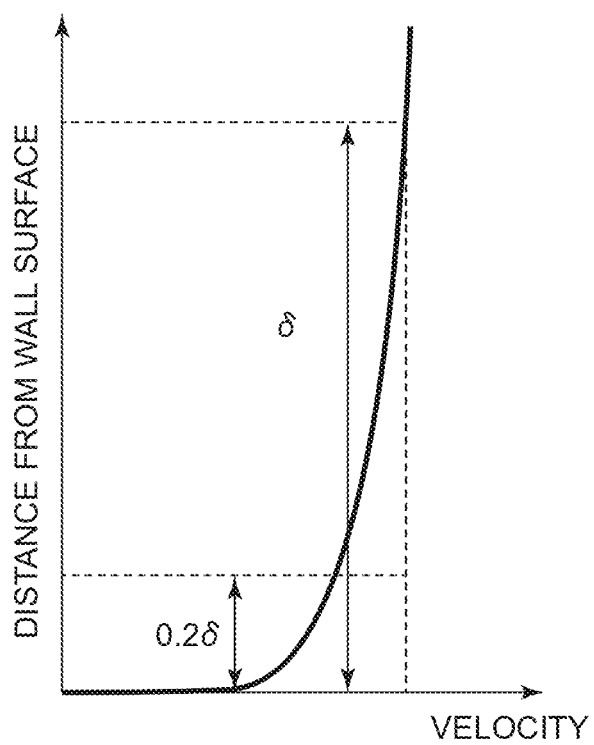
FIG. 11 is a diagram for describing the velocity distribution of the turbulent boundary layer.

FIG. 9 is a schematic diagram showing the rotor radius, the maximum chord length, and the dimensionless radial directional position of the maximum chord length portion. FIG. 10 is a diagram for describing inflow velocity and tip speed ratio of wind to a wind turbine blade. FIG. 11 is a diagram for describing the velocity distribution of the turbulent boundary layer. FIG. 12 is a diagram showing the relationship between the rotor radius and the representative thickness of the boundary layer in the maximum chord cross section, wherein the representative thickness is a dimensionless quantity expressed as a ratio of the maximum chord length. FIG. 13 is a diagram showing the relationship between the rotor radius and the representative thickness of the boundary layer in the maximum chord cross section.

In an embodiment, the wind turbine blade 2 is provided with the vortex generator 10 having a plurality of fins 12, and the height H(m) of each fin 12 and the maximum chord length C(m) of the wind turbine blade satisfy $0.3 \times 10^{-2} \leq H/C \leq 0.9 \times 10^{-2}$ (see FIG. 12).

When applying the vortex generator 10 to the blade root portion (blade root 3) of the wind turbine blade 2, it is important to apply a vortex generator having an appropriate size with respect to the size of the wind turbine blade 2, referring to a parameter related to the wind turbine power generating apparatus 90 (hereinafter, also referred to as merely wind turbine) as an index. In this regard, the present inventors found that it is possible to apply a vortex generator 10 having an appropriate size with respect to the size of a wind turbine blade 2, by deriving a suitable relationship between the maximum chord length $C_{max}$ of the wind turbine blade 2 and the height H of the fin 12 of the vortex generator 10. This finding will be described below with a non-limiting example.

Generally, the optimum size of a vortex generator (hereinafter, also referred to as VG) is determined on the basis of the boundary layer thickness δ at a position for applying the VG. The boundary layer thickness δ varies depending on the operational point and type of the wind turbine. Thus, it is ideal to apply a VG having an appropriate size for each type, from the perspective of aerodynamics. On the other hand, from the perspective of costs, it is desirable to be able to cover a plurality of types of wind turbine with a few types (or one type) of VG.

Herein, when applying a VG to a blade root portion of the wind turbine blade 2, the maximum chord length portion 40 may be regarded as a representative cross section (see FIG. 9). The maximum chord length $C_{max}$ and the dimensionless radial directional position $\mu_c$ ($=r_c/R$) of the maximum chord length portion 40 are determined from aerodynamic performance, blade weight, and transportability, for instance. Experientially, these two parameters are in the following ranges.

$$C_{max}=0.06R \text{ to } 0.08R$$

$$\mu_c=0.2 \text{ to } 0.3R$$

Herein, R is the radius of the rotor 93. On the basis of the above, it is assumed that the parameters are at the following values.

$$C_{max}=0.07R$$

$$\mu_c=0.25R$$

Generally, a wind turbine in recent years has a tip speed ratio of approximately 8 to 10, Because it is necessary to keep the tip speed not higher than 100 m/s to prevent erosion of the blade tip portion. On the basis of this, at a representative operational point of the wind turbine blade 2, it can be assumed that Wind velocity V=8 m/s, tip speed ratio γ=9

Further, the wind inflow velocity W at the maximum chord length portion 40 satisfies the following equation (See FIG. 10).

$$W=\sqrt{(V \cdot \lambda \cdot \mu_c(1+a_2))^2+(V(1-a_1))^2} \approx 19 \text{ [m/s]}$$

Herein, the axial directional induction coefficient $a_1$ is ⅓ of the optimum value, and the tangent directional induction coefficient $a_2$ is zero.

On the basis of the above assumption, the Reynolds number in the cross section at the maximum chord length $C_{max}$ is as follows.

$$Re_c = C_{max} \cdot W / \nu$$
$$= 0.07R \cdot 19/1.5 \times 10^{-5}$$
$$= 8.9 \times 10^4 \times R$$

Herein, ν is a kinematic viscosity coefficient at a normal temperature.

Next, the thickness of the turbulent boundary layer thickness δ on a flat plate can be expressed as follows.

$$\delta = 0.37x/Re_x^{0.2}$$

Herein, x is the distance from the leading edge of the flat plate, and $Re_x$ is a Reynolds number based on x.

The chordwise directional position of VG in the cross section at the maximum chord length $C_{max}$ will be assumed as follows. Since the suitable chordwise directional position of VG closest to the blade tip is considered to be 25% to 75%, $$(x/C)_{ref}=0.5$$

From the above assumption, the boundary layer thickness δ at a VG mounting position may have the following representative value (see FIG. 11).

$$\delta = 0.37x/Re_x^{0.2}$$
$$= 0.37 \cdot (Re_c \cdot x/C)^{-0.2} \cdot 0.5C$$
$$= 0.37 \times (8.9 \times 10^4 \times R \times 0.5)^{-0.2} \times 0.5 \times 0.07R$$
$$= 1.5 \times 10^{-3} R^{0.8} [m]$$

Alternatively, $$\delta/C = 1.5 \times 10^{-3} \times R^{0.8}/0.07R$$
$$= 2.2 \times 10^{-2} R^{0.8} [-]$$

The top portion of a VG needs to be positioned in a region with a sufficient flow velocity. In this regard, the height H of a VG should be approximately 20% to 100% of δ. Thus, the appropriate size herein may be 20% to 80% of δ (H=0.2 to 0.8δ).

Accordingly, the appropriate size of a VG on the wind turbine blade 2 is the shaded region shown in the graphs of FIGS. 12 and 13. In FIGS. 12 and 13, 'y' represents the distance from the surface of the wind turbine blade 2. For instance, in a case where the rotor radius is 100 m or less, from FIG. 12, an appropriate ratio H/C of the chord length C to the VG height H would be 0.3 to 0.9%.

With the above configuration, it is possible to provide a vortex generator 10 having a suitable size with respect to the size of a wind turbine blade 2.

Furthermore, in some embodiments, the height H(m) of each fin 12 and the radius R(m) of the rotor may satisfy $0.2 \times 10^{-3} \leq H/R \leq 0.7 \times 10^{-3}$.

That is, assuming that $C_{max}=0.07R$, $$H/R=0.07H/C_{max}=0.21 \text{ to } 0.63 \times 10^{-3}$$

Thus, by satisfying $0.2 \times 10^{-3} \leq H/R \leq 0.7 \times 10^{-3}$, it is possible to determine an appropriate VG height (size) in relation to the rotor radius R. Thus, it is possible to provide a vortex generator 10 having a suitable size with respect to the size of a wind turbine blade 2.

Furthermore, a method for determining the arrangement of a vortex generator on a wind turbine blade according to at least one embodiment of the present invention is a method for determining the arrangement of the vortex generator on a wind turbine blade described in any one of the above, wherein the vortex generator 10 includes a plurality of fin sets each of which is formed by a pair of fins 12 arranged such that the suction surfaces 9 face each other, and the ratio Z/H of the arrangement pitch Z of adjacent two fin sets to the height H of the pair of fins 12 is not smaller than 6.0 and not greater than 8.0.

As described above, to enhance the effect to suppress separation, it is desirable to arrange the vortex generator 10 densely. On the other hand, as the distance between adjacent fin sets decreases, the effect to suppress separation may decrease due to mutual interference among the generated longitudinal vortices. Thus, by arranging the vortex generator 10 such that Z/H is not small than 6.0 and not greater than 8.0, it is possible to enjoy the effect to suppress separation and the effect to reduce drag at the same time.

Embodiments of the present invention were described in detail above, but the present invention is not limited thereto, and various amendments and modifications may be implemented.

The invention claimed is:

1. A wind turbine blade comprising:
a vortex generator including a plurality of fins,
wherein a height H(m) of each of the fins and a maximum chord length $C_{max}$ (m) of the wind turbine blade satisfy $0.3 \times 10^{-2} \leq H/C_{max} \leq 0.9 \times 10^{-2}$,
wherein the height H of each of the fins satisfies $H \leq 0.1\,\delta_1$, provided that $\delta_1$ is a boundary layer thickness at a rated tip speed ratio in a blade degradation state,
wherein the height H of each of the fins satisfies $H \leq \delta_2$, provided that $\delta_2$ is a boundary layer thickness at an optimum tip speed ratio in a blade normal state in which a surface of the wind turbine blade is smoother than in the blade degradation state,
wherein the height H(m) of each of the fins and a radius R(m) of a rotor including the wind turbine blade satisfies $0.2 \times 10^{-3} \leq H/R \leq 0.7 \times 10^{-3}$,
wherein all of the fins have a same size,
wherein the maximum chord length satisfies a relationship of $0.06 \leq C_{max}/R \leq 0.08$,
wherein the vortex generator includes:
a plurality of fin sets each of which is formed by a pair of fins arranged such that suction surfaces of the pair of fins face each other; and
a platform portion having a circular shape and provided for each of the plurality of fin sets, the pair of fins of said each of the plurality of fin sets being disposed on the platform portion,
wherein a distance between the pair of fins increases from leading edges of the pair of fins toward trailing edges of the pair of fins, and
wherein the vortex generator is arranged such that a ratio Z/S of an arrangement pitch Z of adjacent two of the fin sets to an interval S between the trailing edges of the pair of fins is not smaller than 1.5 and not greater than 3.0.

2. The wind turbine blade according to claim 1, wherein the fins are configured such that an angle of a fin chord with reference to a chordwise direction of the wind turbine blade is not smaller than 12 degrees and not greater than 18 degrees.

3. The wind turbine blade according to claim 1, wherein the fins are configured such that a ratio L/H of a chord length L of a fin root to the height H of each of the fins satisfies $2.0 \leq L/H \leq 4.0$.

4. The wind turbine blade according to claim 1, wherein a cross section of the platform portion has a curved convex shape, at least along a blade spanwise direction of the wind turbine blade.

5. The wind turbine blade according to claim 1, wherein the suction surfaces of the pair of fins face each other, and a ratio S/H of an interval S between the trailing edges of the pair of fins to the height H of each of the pair of fins satisfies $2.5 \leq S/H \leq 5.0$.

6. A method for determining arrangement of a vortex generator on the wind turbine blade according to claim 1, wherein the vortex generator includes a pair of fins arranged line-symmetrically with respect to a segment along a chordwise direction of the wind turbine blade.

7. A method for determining arrangement of a vortex generator on the wind turbine blade according to claim 1, wherein the vortex generator is arranged such that a ratio Z/H of an arrangement pitch Z of adjacent two of the fin sets to the height H of each of the pair of fins is not smaller than 6.0 and not greater than 8.0.

8. The wind turbine blade according to claim 1, wherein the boundary layer thickness $\delta_1$ and the boundary layer thickness $\delta_2$ increase from a leading edge toward a trailing edge of the wind turbine blade in a chordwise direction of the wind turbine blade, and
wherein each of the fins is disposed at a chordwise position such that $0.1\delta_1 \leq H \leq \delta_2$ is satisfied.

* * * * *